United States Patent Office 3,318,768
Patented May 9, 1967

3,318,768
INSECTICIDAL [1 - CYANO - 2 - (1H) - ISOQUINO-
LINYL] - O,O - DIALKYL AMIDE ESTERS OF PHOSPHOTHIOIC ACID
Richard William Young, Wellesley Hills, Mass., and Ernestine Gelblum Abraham, Cumberland, Md., assignors to American Cyanamid Company, Stamford, Conn., a corporation of Maine
No Drawing. Original application Aug. 14, 1963, Ser. No. 301,946, now Patent No. 3,249,614, dated May 3, 1966. Divided and this application Nov. 4, 1965, Ser. No. 506,412
5 Claims. (Cl. 167—33)

This application is a divisional of a copending application for U.S. Letters Patent, Ser. No. 301,946, filed Aug. 14, 1963, now U.S. Patent 3,249,614.

This invention relates to new and useful amide ester derivatives of isoquinolinyl phosphorothioic acid. More particularly, the invention relates to novel insecticidal compositions in which are incorporated as an active ingredient thereof the novel compositions hereinbelow more fully defined. The invention is further concerned with the novel class of compounds: [1-cyano-2-(1H)-isoquinolinyl]-O,O-dialkyl amide esters of phosphorothioic acid.

The insecticidal amide esters of the present invention can be represented by the structure:

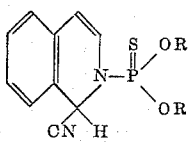

wherein R is an alkyl substituent from one to four carbon atoms and may be the same or different. Compounds within the contemplation of the invention include: [1 - cyano - 2-(1H)-isoquinolinyl]-O,O-dimethyl amide ester of phosphorothioic acid; [1-cyano-2-(1H)-isoquinolinyl]-O,O-diethyl amide ester of phosphorothioic acid; [1 - cyano - 2-(1H)-isoquinolinyl]-O,O-di-n-propyl amide ester of phosphorothioic acid; [1-cyano-2-(1H)-isoquinolinyl]-O,O-di-isopropyl amide ester of phosphorothioic acid; [1 - cyano - 2 - (1H)-isoquinolinyl]-O,O-di-n-butyl amide ester of phosphorothioic acid; and [1-cyano-2-(1H) - isoquinolinyl] - O,O - di-iso-butyl amide ester of phosphorothioic acid.

The novel class of compounds as defined hereinabove can be prepared in a straightforward manner by reacting isoquinoline with an alkali metal cyanide and a di(lower) alkyl thiophosphoryl halide. The reaction may be conveniently written as follows:

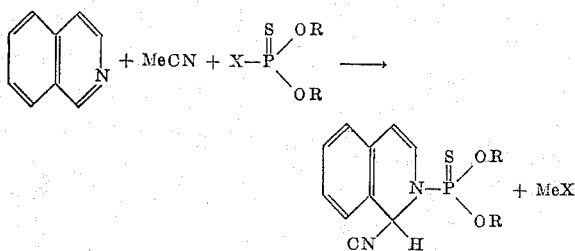

wherein Me is an alkali metal such as sodium, potassium or lithium, X is halogen, such as chlorine or bromine and R is lower alkyl.

Illustrative di(lower)alkyl thiophosphoryl halides include: O,O-dimethylthiophosphoryl chloride, O,O-diethylthiophosphoryl chloride, O,O-diisopropylthiophosphoryl chloride and O,O-di-n-butylthiophosphoryl bromide.

In general, it as been found that (a) from 0.5 mol to 2 mols of isoquinoline, (b) from 2 to 4 mols of an alkali metal cyanide and (c) from 1.5 to 2.5 mols of a dialkylthiophosphoryl halide can be admixed in a suitable inert solvent such as, for instance, methylene chloride, chloroform or ether. However, as a preferred operating range of reactants, 1 mol of the isoquinoline, 2 mols of the dialkylthiophosphoryl halide and 3 mols of the alkali metal cyanide is employed.

The preparation of the novel compositions can be carried out over a wide range of temperatures, usually from about minus (−) 15° C. to about plus (+) 35° C. Since the reaction is exothermic, it is a good operating procedure to maintain a temperature of reaction at below the boiling point of the solvent employed. After completion of the reaction, the temperature is permitted to rise to room temperature so that recovery of product can be readily had.

In order to more fully describe the present invention, the following representative examples are presented which are not to be taken as limitative but merely as illustrative of the invention. Unless otherwise noted, all parts are by weight.

EXAMPLE 1

Preparation of [1-cyano-2-(1H)-isoquinolinyl]-O,O-diethylamide ester of phosphorothioic acid To a suitable reaction vessel is added a mixture of 6 parts of freshly distilled isoquinoline dissolved in 60 parts by volume of methylene chloride and 9.3 parts of potassium cyanide dissolved in 24 parts of water.

The contents of the reaction vessel are stirred and, while stirring, 17.6 parts of diethylthiophosphoryl chloride are added dropwise to the stirred mixture. Reaction is exothermic and the addition of the diethylthiophosphoryl chloride is carried out at such a rate as to maintain the temperature of the mixture at between about 29° C. and 32° C. The reaction mixture is allowed to stand at room temperature for approximately twelve hours. After completion of reaction, the organic layer is separated and washed with water, followed by sodium bicarbonate-water wash. Resultant solution is next dried over anhydrous magnesium sulfate and then stripped of solvent at room temperature and at 0.5 mm. Hg pressure.

The semi-solid residue recovered is sucked dry on a Buchner funnel and recrystallized from methanol by pouring the solvent over the product, filtering and chilling the solution in Dry Ice. Eight (8) parts of white solid product melting at 68° C. to 69° C., are obtained.

Upon analysis, the following is recorded in percent:
Calculated: C, 54.51; H. 5.56; N, 9.08; P, 10.04.
Found: C, 54.58; H, 5.37; N, 9.24; P, 9.90.

Similarly, the dialkyl amide esters of the above compound, such as the dimethyl, the dipropyl and the dibutyl esters are obtained by substituting for the diethylthiophosphoryl chloride reactant, dimethylthiophosphoryl chloride, dipropylthiophosphoryl chloride and dibutylthiophosphoryl bromide, respectively, in the above example. Each of the corresponding alkyl esters is obtained in good yield.

EXAMPLE 2

The insecticidal activity of the compound prepared above is demonstrated in the following example.

Minor amounts of the compound of Example 1, [1-cyano-2-(1H)-isoquinolinyl]-O,O-diethyl amide ester of phosphorothioic acid, is dissolved in a major amount of a solvent comprising 65 percent acetone and 35 percent water at concentrations of 0.1 percent and 0.01 percent, respectively. The insecticidal compositions are next sprayed on army worms and mites. The results of these tests are tabulated below:

TABLE I

| Specie | Percent Kill Concentration | |
| --- | --- | --- |
| | 0.1% | 0.01% |
| Army worm | 100 | 0 |
| Mites, adult | 100 | 100 |
| Mites, eggs | 100 | 80 |

What is claimed is:

1. An insecticidal composition comprising an inert solvent therefor and an effective amount of the compound represented by the formula:

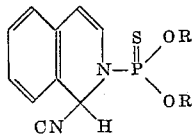

wherein R is lower alkyl substituent.

2. An insecticidal composition according to claim 1 wherein the compound is [1 - cyano-2-(1H)-isoquinolinyl]-O,O-diethylamide ester of phosphorothioic acid.

3. An insecticidal composition according to claim 1 wherein the inert solvent comprises a water-acetone solvent mixture.

4. A method for controlling insect population which comprises: applying to a locus inhabited by insects the insecticidal composition as defined in claim 1 above.

5. A method according to claim 4 for controlling insect population which comprises: applying to a locus inhabited by insects the insecticidal composition as defined in claim 2 above.

No references cited.

LEWIS GOTTS, *Primary Examiner.*

SHEP K. ROSE, *Assistant Examiner.*